United States Patent
Murphy (10) Patent No.: US 8,780,162 B2
(45) Date of Patent: Jul. 15, 2014

(54) METHOD AND SYSTEM FOR LOCATING AN INDIVIDUAL

(75) Inventor: William A. Murphy, Glace Bay (CA)

(73) Assignee: iWatchLife Inc., Ottawa, Ontario (CA)

(*) Notice: Subject to any disclaimer, the term of this patent is extended or adjusted under 35 U.S.C. 154(b) by 379 days.

(21) Appl. No.: 13/198,202

(22) Filed: Aug. 4, 2011

(65) Prior Publication Data

US 2012/0033031 A1 Feb. 9, 2012

Related U.S. Application Data (60) Provisional application No. 61/370,521, filed on Aug. 4, 2010.

(51) Int. Cl.
*H04N 7/14* (2006.01)

(52) U.S. Cl.
USPC ........................................ 348/14.01; 709/204

(58) Field of Classification Search
USPC .................................................... 348/14.016
See application file for complete search history.

(56) References Cited

U.S. PATENT DOCUMENTS

| | | | |
|---|---|---|---|
| 6,166,729 A | 12/2000 | Acosta et al. | |
| 6,195,117 B1 | 2/2001 | Miyazaki et al. | |
| 6,462,785 B1 | 10/2002 | Carraro et al. | |
| 6,831,675 B2 | 12/2004 | Shachar et al. | |
| 6,879,998 B1 | 4/2005 | Raciborski et al. | |
| 7,111,045 B2 | 9/2006 | Kato et al. | |
| 7,382,244 B1 | 6/2008 | Donovan | |
| 7,839,926 B1 | 11/2010 | Metzger et al. | |
| 7,881,505 B2 | 2/2011 | Schneiderman et al. | |
| 8,041,338 B2 | 10/2011 | Chen et al. | |
| 8,139,817 B2 | 3/2012 | Laganiere | |
| 8,185,959 B2 | 5/2012 | Bellwood et al. | |
| 8,290,999 B2 | 10/2012 | Shepherd et al. | |
| 8,326,327 B2 | 12/2012 | Hymel et al. | |
| 8,335,763 B2 | 12/2012 | Narayanan et al. | |
| 8,396,246 B2 | 3/2013 | Anbalagan et al. | |
| 8,433,136 B2 | 4/2013 | Epshtein et al. | |
| 8,448,072 B1 | 5/2013 | Lai | |

(Continued)

FOREIGN PATENT DOCUMENTS

| | | | |
|---|---|---|---|
| JP | 2004120178 A | 4/2004 | |
| JP | 2004180290 A | 6/2004 | |

(Continued)

OTHER PUBLICATIONS

Saptharish, M. et al., "An Information Value Driven Architecture for Urban Video Surveillance in Data and Attention Bandwidth Constrained Environments," Proceedings of the Sixth IEEE International Conference on Advanced Video and Signal Based Surveillance, pp. 122-127, Sep. 2-4, 2009.

*Primary Examiner* — Maria El-Zoobi
(74) *Attorney, Agent, or Firm* — Freedman & Associates (57) ABSTRACT

A method of locating a first user comprises receiving at a server, via a communication network, video data from a sensor at a predetermined location that is remote from the server. Using a process in execution on a processor of the server, at least one of video analytics, image analytics and audio analytics is performed for determining a presence of the first user at the predetermined location. When a result of the video analytics is indicative of the first user being present at the predetermined location, an indication that the first user is at the predetermined location is retrievably stored within a memory element of the server.

12 Claims, 7 Drawing Sheets

(56) References Cited

U.S. PATENT DOCUMENTS

| | | |
|---|---|---|
| 8,473,420 B2 * | 6/2013 | Bohus et al. ............... 705/319 |
| 2003/0025599 A1 | 2/2003 | Monroe |
| 2003/0070177 A1 | 4/2003 | Kondo et al. |
| 2003/0107648 A1 | 6/2003 | Stewart et al. |
| 2003/0167176 A1 * | 9/2003 | Knudson et al. ............... 705/1 |
| 2003/0204856 A1 | 10/2003 | Buxton |
| 2004/0240546 A1 | 12/2004 | Wells |
| 2005/0169546 A1 | 8/2005 | Shin |
| 2005/0195823 A1 | 9/2005 | Chen et al. |
| 2005/0271250 A1 | 12/2005 | Vallone et al. |
| 2006/0053459 A1 | 3/2006 | Simerly et al. |
| 2006/0192698 A1 | 8/2006 | Morel |
| 2006/0195569 A1 | 8/2006 | Barker |
| 2006/0239645 A1 | 10/2006 | Curtner et al. |
| 2006/0271658 A1 | 11/2006 | Beliles |
| 2007/0013776 A1 | 1/2007 | Venetianer |
| 2007/0035632 A1 | 2/2007 | Silvernail et al. |
| 2007/0082700 A1 | 4/2007 | Landschaft et al. |
| 2007/0172155 A1 | 7/2007 | Guckenberger |
| 2007/0217765 A1 | 9/2007 | Itoh et al. |
| 2008/0108339 A1 | 5/2008 | Shaffer et al. |
| 2008/0129844 A1 | 6/2008 | Cusack et al. |
| 2008/0136908 A1 * | 6/2008 | Carter ............... 348/143 |
| 2008/0166966 A1 | 7/2008 | Hamasaki et al. |
| 2008/0184245 A1 | 7/2008 | St-Jean |
| 2008/0235592 A1 | 9/2008 | Trauth |
| 2008/0243614 A1 | 10/2008 | Tu et al. |
| 2008/0258880 A1 | 10/2008 | Smith et al. |
| 2008/0270490 A1 | 10/2008 | Watterott et al. |
| 2008/0279481 A1 | 11/2008 | Ando |
| 2008/0304565 A1 | 12/2008 | Sakhardande et al. |
| 2009/0015671 A1 | 1/2009 | Addy |
| 2009/0021583 A1 | 1/2009 | Salgar et al. |
| 2009/0031381 A1 | 1/2009 | Cohen et al. |
| 2009/0122150 A1 | 5/2009 | Shabtay et al. |
| 2009/0141939 A1 | 6/2009 | Chambers |
| 2009/0141993 A1 | 6/2009 | Ma et al. |
| 2009/0174763 A1 | 7/2009 | Bengtsson |
| 2009/0189981 A1 | 7/2009 | Siann et al. |
| 2009/0213245 A1 | 8/2009 | Harper et al. |
| 2009/0217343 A1 | 8/2009 | Bellwood |
| 2009/0219387 A1 | 9/2009 | Marman |
| 2009/0219411 A1 | 9/2009 | Marman et al. |
| 2009/0225164 A1 | 9/2009 | Renkis |
| 2009/0238542 A1 | 9/2009 | Adiletta et al. |
| 2009/0245573 A1 | 10/2009 | Saptharishi et al. |
| 2009/0324137 A1 | 12/2009 | Stallings et al. |
| 2010/0097471 A1 | 4/2010 | Drive et al. |
| 2010/0158315 A1 | 6/2010 | Martin |
| 2010/0177938 A1 | 7/2010 | Martinez et al. |
| 2010/0191827 A1 | 7/2010 | Martin |
| 2010/0231714 A1 | 9/2010 | Flores et al. |
| 2011/0022529 A1 | 1/2011 | Barsoba et al. |
| 2011/0092248 A1 | 4/2011 | Evanitsky |
| 2011/0109742 A1 | 5/2011 | Laganiere |
| 2011/0112899 A1 | 5/2011 | Strutton et al. |
| 2011/0113461 A1 | 5/2011 | Laganiere |
| 2011/0143728 A1 | 6/2011 | Holopainen |
| 2011/0211584 A1 | 9/2011 | Mahmoud |
| 2011/0211764 A1 | 9/2011 | Krupka |
| 2011/0267462 A1 | 11/2011 | Cheng |
| 2011/0273563 A1 | 11/2011 | Murphy |
| 2011/0314159 A1 | 12/2011 | Murphy |
| 2012/0015668 A1 | 1/2012 | Mgrdechian et al. |
| 2012/0033026 A1 | 2/2012 | Murphy |
| 2012/0033027 A1 | 2/2012 | Murphy |
| 2012/0033028 A1 | 2/2012 | Murphy |
| 2012/0036262 A1 | 2/2012 | Murphy |
| 2012/0098918 A1 | 4/2012 | Murphy |
| 2012/0129553 A1 | 5/2012 | Phillips et al. |
| 2012/0194676 A1 | 8/2012 | Laganiere |
| 2012/0195363 A1 | 8/2012 | Laganiere |
| 2012/0207349 A1 | 8/2012 | Murphy |
| 2012/0207356 A1 | 8/2012 | Murphy |
| 2014/0036073 A1 | 2/2014 | Black |
| 2014/0036090 A1 | 2/2014 | Black |

FOREIGN PATENT DOCUMENTS

| | | |
|---|---|---|
| JP | 2006279464 A | 10/2006 |
| WO | WO 2005/004062 A2 | 1/2005 |
| WO | WO 2006/012384 A2 | 2/2006 |
| WO | WO 2008/092255 A1 | 8/2008 |
| WO | WO 2008/154003 A2 | 12/2008 |
| WO | WO 2009/111377 A1 | 9/2009 |

* cited by examiner

METHOD AND SYSTEM FOR LOCATING AN INDIVIDUAL

This application claims the benefit of U.S. Provisional Patent Application No. 61/370,521, filed on Aug. 4, 2010, the entire contents of which are incorporated herein by reference.

FIELD OF THE INVENTION

The instant invention relates generally to communication methods and systems, and more particularly to a method and system for locating an individual at a user system within a communication network.

BACKGROUND OF THE INVENTION

Telecommunication technologies allow two or more parties to communicate almost instantly, even over vast distances. In the early part of the last century, landline telephones became essentially ubiquitous in developed countries. More recently, cellular wireless telephone networks have emerged, allowing parties to communicate with one another from virtually anywhere within a cellular network coverage area.

Videoconferencing has also emerged recently as a viable alternative to voice-only communication. A videoconference is a set of interactive telecommunication technologies, which allow two or more parties to interact via two-way video and audio transmissions simultaneously. Webcams are popular, relatively low cost devices that can provide live video streams via personal computers, and can be used with many software clients for videoconferencing over the Internet.

A voice over Internet Protocol (VoIP) software client, such as for instance Skype®, is an example of a technology that supports voice-only and/or videoconferencing communication between two or more parties. During use, the VoIP application is in execution on a computer or on another suitable device that is associated with a first party. The VoIP application, and other similar applications, typically provides a list of user names associated with other parties, including an indication of the current status of each of the other parties. Accordingly, a first user can determine when another user is online for a Skype to Skype (VoIP) chat or call, unless the other user wishes to remain hidden. When a second party appears to be available, the first party may attempt to initiate a communication session with the second party. For instance, the first party selects a user name associated with the second party from the list, and then selects an option for initiating a "call" to the second user. The VoIP application that is in execution on a computer or on another suitable device associated with the second party causes an alert to be issued, such as for instance playing a "ringing" sound via a speaker of the computer or other suitable device. In response to the alert, the second party answers the "call" originating from the first party.

Unfortunately, the indicated status of the second party often does not reflect the actual status of the second party. For instance, the second party may fail to change the status indicator from "online" to "away," especially during short or unexpected breaks, or when the second party moves to a different system etc. It is a disadvantage of the prior art that the first party may attempt to contact the second party when the second party is not present. In the prior art system, when the second party is not present to answer the "call," the first party merely receives a message indicating that the second party is not available, and is invited to leave a voice message for the second party. Of course, the second party does not receive the voice message immediately. Often, by the time the second party receives the voice message the first party is no longer interested in establishing a communication session.

It would be advantageous to provide a method and system for making video calls that overcomes at least some of the above-mentioned limitations of the prior art.

SUMMARY OF EMBODIMENTS OF THE INVENTION

In accordance with an aspect of the invention there is provided a method of locating a first user, comprising: providing a plurality of first systems, each first system of the plurality of first systems including at least an electronic sensing device for capturing at least one of audio, image and video data within a sensing area of said each first system; associating the first user with a first subset of the plurality of first systems; transmitting from a second system a location request signal indicative of a request for locating the first user; in response to the location request signal, capturing the at least one of audio, image and video data within the sensing area of each first system of the first subset of the plurality of first systems; performing at least one of audio, image and video analytics of the at least one of audio, image and video data captured using the electronic sensing device of each first system of the first subset of the plurality of first systems; and, based on a result of the at least one of audio, image and video analytics, identifying the first user within the sensing area of one of the first systems of the first subset of the plurality of first systems.

According to another aspect, the invention provides for a method wherein the location request signal is transmitted, via a communication network, from the second system to each first system of the first subset of the plurality of first systems.

According to another aspect, the invention provides for a method wherein the at least one of audio, image and video analytics is performed using at least a process in execution on a processor of a same first system that captured the at least one of audio, image and video data.

According to another aspect, the invention provides for a method wherein the at least one of audio, image and video analytics is performed using at least a process in execution on a processor of the second system.

According to another aspect, the invention provides for a method wherein the second system is a network server.

According to another aspect, the invention provides for a method, wherein the network server is at least one of an audio analytics server, an image analytics server and a video analytics server.

According to another aspect, the invention provides for a method wherein the second system comprises a plurality of user systems, and wherein performing the at least one of audio, image and video analytics is accomplished according to a peer-to-peer protocol.

According to another aspect, the invention provides for a method comprising transmitting a location indication signal, via the communication network, from the one of the first systems of the first subset of the plurality of first systems to the second system, for indicating the location of the first user.

According to another aspect, the invention provides for a method comprising transmitting a locate termination signal, via the communication network, from the one of the first systems of the first subset of the plurality of first systems to each of the other ones of the first systems of the first subset of the plurality of first systems.

According to another aspect, the invention provides for a method wherein the at least one of audio, image and video analytics comprises video analytics.

According to another aspect, the invention provides for a method wherein the at least one of audio, image and video analytics comprises comparing the captured at least one of audio, image and video data with template data associated with the first user.

According to another aspect, the invention provides for a method wherein comparing comprises uniquely identifying the first user.

According to another aspect, the invention provides for a method wherein comparing comprises identifying a group of individuals, each individual of the group being identified as the first user with a predetermined minimum probability score.

According to another aspect, the invention provides for a method wherein the location request signal is transmitted, via a first communication network, from the second system to a third system, the third system being in communication with each first system of the first subset of the plurality of first systems via a second communication network.

According to another aspect, the invention provides for a method comprising transmitting the captured at least one of audio, image and video data from at least some first systems of the first subset of the plurality of first systems to the third system via the second communication network.

According to another aspect, the invention provides for a method wherein a process in execution on a processor of the third system performs the at least one of audio, image and video analytics of the at least one of audio, image and video data received from the at least some first systems.

According to another aspect, the invention provides for a method comprising transmitting a location indication signal, via the first communication network, from the third system to the second system, the location indication signal for indicating a location of the first user within the sensing area of the one of the first systems of the first subset of the plurality of first systems.

According to another aspect, the invention provides for a method comprising storing within a memory element of the third system location data indicative of a location of the first user within the sensing area of the one of the first systems of the first subset of the plurality of first systems.

According to another aspect, the invention provides for a method wherein the first communication network is the same as the second communication network.

According to another aspect, the invention provides for a method wherein, in aggregate, the sensing areas the first systems of the first subset of the plurality of first systems define a non-contiguous electronic surveillance zone.

In accordance with an aspect of the invention there is provided a method of locating a first user, comprising: associating the first user with a plurality of first systems, each first system of the plurality of first systems including at least an electronic sensing device for sensing data within a sensing area of said each first system; using a second system, transmitting a signal indicative of a request for locating the first user within the sensing area of one of the plurality of first systems; performing at least one of audio, image and video analytics of data that are sensed using the electronic sensing device of each first system of the plurality of first systems, to determine a presence of the first user within the sensing area of one of the plurality of first systems; and, when the first user is determined to be present within the sensing area of the one of the plurality of first systems, providing a first indication indicative of the location of the first user within the sensing area of the one of the plurality of first systems.

According to another aspect, the invention provides for a method wherein the plurality of first systems is part of a known group of first systems including other first systems in addition to the plurality of first systems.

According to another aspect, the invention provides for a method wherein the sensed data are transmitted from each first system of the plurality of first systems to the second system via a communication network, and wherein performing is performed using at least a process in execution on a processor of the second system.

According to another aspect, the invention provides for a method wherein the first indication is provided to a second user via the second system.

According to another aspect, the invention provides for a method wherein the sensed data are transmitted from each first system of the plurality of first systems to a third system via a communication network, and wherein performing is performed using a processor of the third system.

According to another aspect, the invention provides for a method wherein the third system is a network server.

According to another aspect, the invention provides for a method wherein the network server is at least one of an audio analytics server, an image analytics server and a video analytics server.

According to another aspect, the invention provides for a method wherein the third system comprises a plurality of user systems, and wherein performing the at least one of audio, image and video analytics is accomplished according to a peer-to-peer protocol.

According to another aspect, the invention provides for a method wherein the first indication is provided to a second user via the second system.

According to another aspect, the invention provides for a method wherein the first indication is stored within a memory element of the third system.

According to another aspect, the invention provides for a method wherein each first system comprises a processor for performing the at least one of audio, image and video analytics of data that are sensed using the electronic sensing device of said each first system.

According to another aspect, the invention provides for a method wherein the location request signal is transmitted, via a communication network, from the second system to each first system of the plurality of first systems.

According to another aspect, the invention provides for a method wherein the at least one of audio, image and video analytics comprises video analytics.

According to another aspect, the invention provides for a method wherein the at least one of audio, image and video analytics comprises comparing the sensed data with template data associated with the first user.

According to another aspect, the invention provides for a method wherein comparing comprises uniquely identifying the first user.

According to another aspect, the invention provides for a method wherein comparing comprises identifying a group of individuals, each individual of the group being identified as the first user with a predetermined minimum probability score.

In accordance with an aspect of the invention there is provided a method of locating a first user, comprising: providing a plurality of imaging devices, each imaging device of the plurality of imaging devices having associated therewith a known field of view (FOV); associating the first user with a known first subset of the plurality of imaging devices, wherein the first subset of the plurality of imaging devices defines a first aggregated FOV; using a first system, transmitting a first signal from a second user indicative of a request by the second user for locating the first user within the first aggregated FOV; performing at least one of image analytics and video analytics of data that are captured using the imaging devices of the first subset of the plurality of imaging devices, to determine a location of the first user within the first aggregated FOV; and, when the first user is located within the first aggregated FOV, providing to the second user a first indication indicative of the location of the first user within the first aggregated FOV.

According to another aspect, the invention provides for a method comprising, in response to the first signal, capturing data using each imaging device of the first subset of the plurality of imaging devices.

According to another aspect, the invention provides for a method wherein determining a location of the first user within the first aggregated FOV comprises determining a presence of the first user within data that are captured using a known imaging device of the first subset of the plurality of imaging devices.

According to another aspect, the invention provides for a method wherein the first indication includes an identifier of the known imaging device of the first subset of the plurality of imaging devices.

According to another aspect, the invention provides for a method wherein the first indication is provided to the second user via the first system.

According to another aspect, the invention provides for a method wherein the at least one of image analytics and video analytics is performed using a processor of the first system.

According to another aspect, the invention provides for a method wherein each imaging device of the first subset of the plurality of imaging devices comprises a processor for performing the at least one of image analytics and video analytics of data that are captured by said each imaging device.

According to another aspect, the invention provides for a method wherein the at least one of image analytics and video analytics comprises comparing the captured data with template data associated with the first user.

According to another aspect, the invention provides for a method wherein comparing comprises uniquely identifying the first user.

According to another aspect, the invention provides for a method comprising associating a third user with a known second subset of the plurality of imaging devices, wherein the second subset of the plurality of imaging devices defines a second aggregated FOV.

According to another aspect, the invention provides for a method wherein the second aggregated FOV partially overlaps the first aggregated FOV.

In accordance with an aspect of the invention there is provided a system of locating a first user, comprising: receiving at a server, via a communication network, video data from a sensor at a predetermined location that is remote from the server; using a process in execution on a processor of the server, performing video analytics for determining a presence of the first user at the predetermined location; when a result of the video analytics is indicative of the first user being present at the predetermined location, retrievably storing within a memory element of the server an indication that the first user is at the predetermined location.

According to another aspect, the invention provides for a method wherein the sensor is one of a plurality of sensors associated with the first user.

According to another aspect, the invention provides for a method wherein the plurality of sensors is a subset of available sensors.

According to another aspect, the invention provides for a method wherein performing video analytics comprises comparing the video data from the sensor with template data of the first user.

According to another aspect, the invention provides for a method wherein determining a presence of the first user comprises identifying uniquely the first user.

According to another aspect, the invention provides for a method wherein the server is a video analytics server.

According to another aspect, the invention provides for a method wherein the server is a server of a video analytics server farm.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
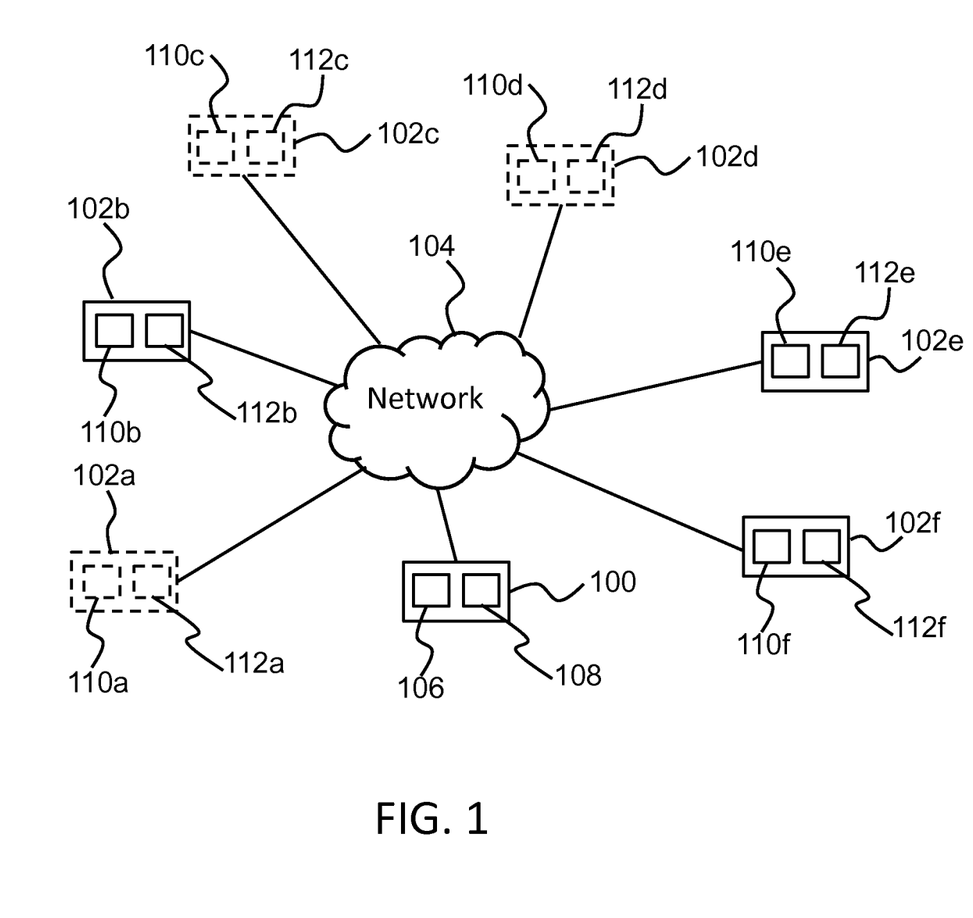
FIG. 1 is a simplified schematic diagram showing a system according to an embodiment of the instant invention.

FIG. 1 is a schematic diagram showing a system according to an embodiment of the instant invention. A first user system 100 is in communication with a plurality of second user systems 102a-f via a communication network 104. The communication network 104 is one of a local area network (LAN) and a wide area network (WAN). For instance, the communication network 104 is an Internet Protocol (IP) network. The first user system 100 is associated with a first user. Optionally, the first user system 100 is associated with other users as well. A second user is associated with only a subset 102b, 102e and 102f of the plurality of second user systems 102a-f. By way of a specific and non-limiting example, the plurality of second user systems 102a-f is located within a corporate setting. In this example the second user, during the execution of his or her daily duties, is known to access one or more of the subset of second user systems 102b, 102e and 102f, but not the other second user systems 102a, 102c or 102d. For instance, the subset of second user systems 102b, 102e and 102f is located at the head office of the corporation, whereas the other second user systems 102a, 102c and 102d are located on the floor of a manufacturing plant of the corporation.

The first user system 100 comprises a processor 108, and each one of the plurality of second user systems 102a-f comprises a processor 112a-f, respectively, the processors 108 and 112a-f for executing machine readable code for implementing software applications, etc. For instance, the processors 108 and 112a-f are for implementing at least one of an email application, a social networking application such as for instance Facebook®, a Voice over Internet Protocol (VoIP) application such as for instance Skype®, an instant messaging (IM) application, or another communication application.

Each one of the second user systems 102a-f further comprises an electronic sensor 110a-f, respectively, for sensing data within a sensing area of the second user system 102a-f. For instance, the electronic sensor 110a-f is one of an audio sensor for sensing audio data and an image sensor for sensing image or video data. Optionally, the first user system 100 also comprises an electronic sensor 106 for sensing data within a sensing area of the first user system 100. Optionally, in order to support bidirectional audio and video communication, the first user system 100 and each one of the second user systems 102a-f comprises an audio sensor and a video sensor, as well as audio and video output devices, such as for instance a display screen and speakers, respectively. By way of a specific and non-limiting example, the electronic sensor 106 of the first user system 100 and the electronic sensors 110a-f of the second user systems 102a-f each comprise a microphone and a web cam or another type of video camera (such as for instance an IP camera), either of which may be provided in communication with the second user system 102a-f or with the first user system 100 via a USB port or via a wireless communication interface. Optionally, the image (or video) sensor is designed to operate in one or more of the visible and infra-red regions of the electromagnetic spectrum. Optionally, one or both of the microphone and the web cam (or other type of camera) are external peripheral devices of the first and second user systems. Optionally, one or both of the microphone and the web cam (or other type of camera) are integrated devices of the first and second user systems.

Alternatively, the electronic sensor 110a-f is co-located with a respective one of the plurality of second user systems 102a-f, but is separate from the respective one of the plurality of second user systems 102a-f. For instance, the electronic sensor 110a-f is a network (IP) camera that is capable of streaming video data directly to the first system 102, via the communication network 104. Optionally, the electronic sensor 110a-f senses one or more of audio, image and video data at the location of the respective second system 102a-f. In one implementation, the electronic sensor 110a-f is an edge device that is capable of performing one or more of audio, image and video analytics of the data that are sensed thereby.

During use, the first party transmits a location request signal from the first user system 100, the location request signal indicative of a request for locating the second user. By way of a specific and non-limiting example, the first user is a receptionist at a front desk of the corporate head office. When a visitor wishes to meet with the second user, the receptionist uses the first system 100 to transmit a signal for requesting an identification of the current location of the second user. The signal is transmitted, via communication network 104, to each second user system of the subset 102b, 102e and 102f of the plurality of second user systems 102a-f. In response to receiving the location request signal, each one of the electronic sensors 110b, 110e and 110f captures at least one of audio, image and video data within the sensing area thereof.

At least one of audio, image and video analytics of the at least one of audio, image and video data is performed to identify the second user within the sensing area of one of the electronic sensors 110b, 110e and 110f. According to one implementation, the at least one of audio, image and video analytics of data that are sensed by the electronic sensors 110b, 110e and 110f is performed using a process in execution on the processors 112b, 112e and 112f, respectively (processing performed locally). When the process in execution on one of the processors 112b, 112e or 112f identifies the second user, a location indication signal is transmitted to the first user system 100. In addition, a locate termination signal is transmitted to the other ones of the processors 112b, 112e and 112f for terminating the search for the second user thereby. Alternatively, when the process in execution on one of the processors 112b, 112e or 112f identifies the second user, a location notification signal is provided to the second user, for informing the second user that the first user is attempting to locate him or her.

Optionally, the processing that is performed locally to the processors 112b, 112e and 112f does not identify the second user uniquely. Instead, the locally performed processing merely detects motion (relatively simple analytics) and/or the presence of a person (medium relative difficulty analytics). Optionally, the processing that is performed locally to the processors 112b, 112e and 112f tracks a time property of the sensed data, such as for instance whether a detected person is merely passing by one of the second user systems 102b,e,f, or whether a detected person is seated at one of the second user systems 102b,e,f. Further optionally, the sensed data are partially analyzed locally to the second user system 102b,e,f, such as for instance to detect motion or to detect a person, and the sensed data are subsequently transmitted to another system, such as for instance the first user system 100, to undergo an analytics process of higher relative difficulty, such as for instance identifying uniquely the second user based on the sensed data. Optionally, the higher relative difficulty analytics comprises determining facial characteristics of the sensed person, and/or comparing the sensed data to a database of known faces, etc.

According to an alternative implementation, the at least one of audio, image and video data sensed by the electronic sensors 110b, 110e and 110f are transmitted to the first user system 100 via the communication network. Subsequently, the at least one of audio, image and video analytics of the data that are sensed by the electronic sensors 110b, 110e and 110f is performed using a process in execution on processor 108 of the first user system 100. When the process in execution on processor 108 identifies the second user, a locate termination signal is transmitted to the subset of second user systems 102b, 102e and 102f for terminating the transmission of sensed data to the first user system 100.

Optionally, transmitting video data between the second user system 102b,e,f and the first user system 100, via communication network 104, comprises streaming the video data, or alternatively it comprises "trickling" individual non-adjacent frames of video data as is described in U.S. Provisional Patent Application 61/249,384 entitled "Video Analytics Method and System," the entire contents of which are incorporated herein by reference. Optionally, video analytics and/or audio analytics processing is distributed to a plurality of first user systems, such as for instance user systems of a plurality of other Skype® users in a peer-to-peer approach.

In the above implementations, the at least one of audio, image and video analytics comprises comparing the sensed at least one of audio, image and video data with template data associated with the second user. In particular, the at least one of audio, image and video analytics comprises uniquely identifying the second user. Optionally, video/image/audio analytics is performed to detect "a" person within a sensing area of the second electronic sensors 110b,e,f, after which a prompt is provided requesting the detected person to provide a unique identification (such as speak a user name, password, employee number, etc.) or provide a biometric sample such as a voice sample or high-quality facial image. Unique identification of the detected person as the second user, in this implementation, is based on a combination of the result of relatively less difficult analytics processing and user identification data that is provided by the detected person.

In an alternative application, the system of FIG. 1 is used to identify and locate any member of a predetermined group of individuals. For instance, the location of any manager or any administrative assistant etc. may be requested within a corporate setting. Further alternatively, the system of FIG. 1 is used to identify and locate an inanimate object, such as for instance a parcel, a car, a courier, etc. Once the inanimate object is located, relatively simple video/image/audio analytics may be performed to detect any and initiate a communication with any person proximate the inanimate object.

In one specific and non-limiting implementation, the electronic sensors 110b, 110e and 110f are video cameras, each of which captures video data within a respective field of view (FOV) thereof. Collectively, the electronic sensors 110b, 110e and 110f define an aggregated FOV, which is optionally a non-contiguous FOV. Identification of the second user, or another target described above, is based on a result of performing video analytics of the captured video data.

Figure 2:
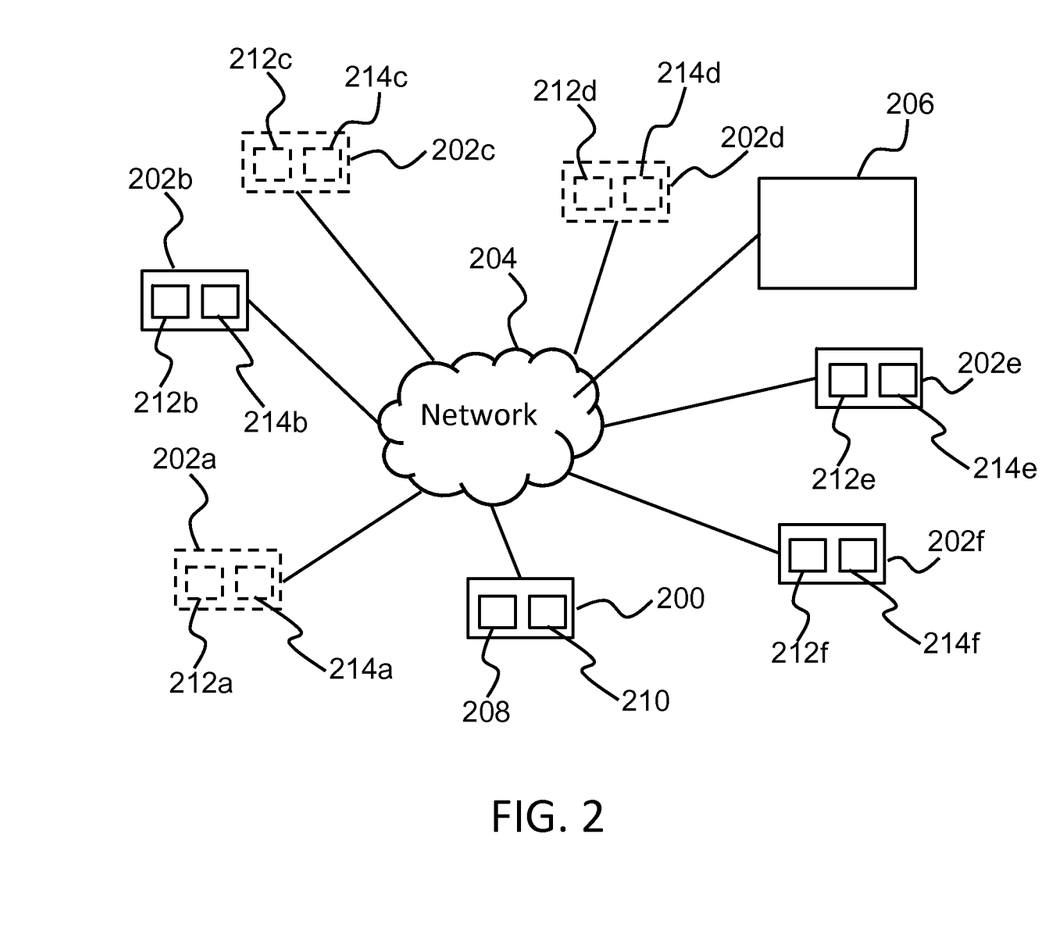
FIG. 2 is a simplified schematic diagram showing a system according to an embodiment of the instant invention.

Referring now to FIG. 2, shown is a schematic diagram of a system according to an embodiment of the instant invention. A first user system 200 is in communication with a plurality of second user systems 202a-f via a communication network 204. The communication network 204 is one of a local area network (LAN) and a wide area network (WAN). For instance, the communication network 204 is an Internet Protocol (IP) network. In addition, a third system 206 is in communication with at least one of the first user system 200 and the plurality of second user systems 202a-f.

Referring still to FIG. 2, the first user system 200 is associated with a first user. Optionally, the first user system 200 is associated with other users as well. A second user is associated with only a subset 202b, 202e and 202f of the plurality of second user systems 202a-f. By way of a specific and non-limiting example, the plurality of second user systems 202a-f is located within a corporate setting. In this example the second user, during the execution of his or her daily duties, is known to access one or more of the subset of second user systems 202b, 202e and 202f, but not the other second user systems 202a, 202c or 202d. For instance, the subset of second user systems 202b, 202e and 202f is located at the head office of the corporation, whereas the other second user systems 202a, 202c and 202d are located on the floor of a manufacturing plant of the corporation.

The first user system 200 comprises a processor 208, and each one of the plurality of second user systems 202a-f comprises a processor 212a-f, respectively, the processors 208 and 212a-f for executing machine readable code for implementing software applications, etc. For instance, the processors 208 and 212a-f are for implementing at least one of an email application, a social networking application such as for instance Facebook®, a Voice over Internet Protocol (VoIP) application such as for instance Skype®, an instant messaging (IM) application, or another communication application.

Each one of the second user systems 202a-f further comprises an electronic sensor 214a-f, respectively, for sensing data within a sensing area of the second user system 202a-f. For instance, the electronic sensor 214a-f is one of an audio sensor for sensing audio data and an image sensor for sensing image or video data. Optionally, the first user system 200 also comprises an electronic sensor 210 for sensing data within a sensing area of the first user system 200. Optionally, in order to support bidirectional audio and video communication, the first user system 200 and each of the second user systems 202a-f comprises an audio sensor and a video sensor, as well as audio and video output devices, such as for instance a display screen and speakers, respectively. By way of a specific and non-limiting example, the electronic sensor 210 of the first user system 200 and the electronic sensor 214a-f of the second user systems 202a-f each comprise a microphone and a web cam or another type of video camera (such as for instance an IP camera), either of which may be provided in communication with the second user system 202a-f or with the first user system 200 via a USB port or via a wireless communication interface. Optionally, the image (or video) sensor is designed to operate in one or more of the visible and infra-red regions of the electromagnetic spectrum. Optionally, one or both of the microphone and the web cam (or other type of camera) are external peripheral devices of the first and second user systems. Optionally, one or both of the microphone and the web cam (or other type of camera) are integrated devices of the first and second user systems.

Alternatively, the electronic sensor 214a-f is co-located with a respective one of the plurality of second user systems 202a-f, but is separate from the respective one of the plurality of second user systems 202a-f. For instance, the electronic sensor 214a-f is a network (IP) camera that is capable of streaming video data directly to the third system 206, via the communication network 204. Optionally, the electronic sensor 214a-f senses one or more of audio, image and video data at the location of the respective second system 202a-f. In one implementation, the electronic sensor 214a-f is an edge device that is capable of performing one or more of audio, image and video analytics of the data that are sensed thereby. Optionally, transmitting video data between the electronic sensor 214a-f and the third system 206, via communication network 204, comprises "trickling" individual non-adjacent frames of video data as is described in U.S. Provisional Patent Application 61/249,384 entitled "Video Analytics Method and System." When an event is detected, such as for instance when an edge-device electronic sensor 214a-f detects motion, then optionally full frame video data is transmitted to the third system 206.

The third system 206 is, for instance, a network server. By way of a specific and non-limiting example, the third system 206 is a video analytics server, or a video analytics server farm. Optionally, the third system 206 performs audio analytics and/or image analytics.

During use, the first party transmits a location request signal from the first user system 200, the location request signal indicative of a request for locating the second user. By way of a specific and non-limiting example, the first user is a receptionist at a front desk of the corporate head office. When a visitor wishes to meet with the second user, the receptionist uses the first system 200 to transmit a signal for requesting an identification of the current location of the second user. The signal is transmitted, via communication network 204, to each second user system of the subset 202b, 202e and 202f of the plurality of second user systems 202a-f. In response to receiving the location request signal, each one of the electronic sensors 214b, 214e and 214f captures at least one of audio, image and video data within the sensing area thereof.

The at least one of audio, image and video data are transmitted, via communication network 204, from the locations of the subset of second user systems 202b, 202e and 202f to the third system 206. A process in execution on a processor of the third system 206 performs at least one of audio, image and video analytics of the at least one of audio, image and video data. In particular, the at least one of audio, image and video analytics is performed to identify the second user within the sensing area of one of the electronic sensors 214b, 214e and 214f.

When the process in execution on the processor of the third system 206 identifies the second user, a location indication signal is transmitted from the third system 206 to the first user system 200, via communication network 204. In addition, a locate termination signal is transmitted to the subset of the second user systems 202b, 202e and 202f for terminating the search for the second user, and for optionally terminating the transmission of sensed data to the third system 206. Alternatively, when the process in execution on the processor of the third system 206 identifies the second user, a location notification signal is provided to the second user, for informing the second user that the first user is attempting to locate him or her.

According to an alternative implementation, the location request signal is transmitted from the first user system 200 directly to the third system 206, via the communication network 204. Based on stored mapping data, the third system determines the subset of the plurality of second user systems with which the second user is associated. The third system subsequently causes the at least one of audio, image and video data to be transmitted from each second user system of the subset of the plurality of second user systems. Of course, if the third system is receiving continuously at least one of audio, image and video data from each of the plurality of second user systems, then the third system merely begins performing the at least one of audio, image and video analytics of the data that is received from the second user systems of the subset of the plurality of second user systems. When the second user is identified, a location indication signal is transmitted from the third system 206 to the first user system 200, via communication network 204.

In the above implementations, the at least one of audio, image and video analytics comprises comparing the sensed at least one of audio, image and video data with template data associated with the second user. In particular, the at least one of audio, image and video analytics comprises uniquely identifying the second user.

Optionally, at least some initial processing is performed locally to the subset of second user systems 202b, 202e and 202f. The initial processing does not identify the second user uniquely. Instead, the locally performed processing merely detects motion (relatively simple analytics) and/or the presence of a person (medium relative difficulty analytics). Optionally, the processing that is performed locally to the subset of second user systems 202b, 202e and 202f tracks a time property of the sensed data, such as for instance whether a detected person is merely passing by one of the second user systems 202b, 202e or 202f, or whether a detected person is seated at one of the second user systems 202b, 202e or 202f.

Optionally, the third system 206 is a plurality of other systems. For instance, the video analytics and/or audio analytics processing is distributed to a plurality of other user systems, such as for instance user systems of a plurality of other Skype® users in a peer-to-peer approach.

In one specific and non-limiting implementation, the electronic sensors 214b, 214e and 214f are video cameras, each of which captures video data within a respective field of view (FOV) thereof. Collectively, the electronic sensors 214b, 214e and 214f define an aggregated FOV, which is optionally a non-contiguous FOV. Identification of the second user is based on a result of performing video analytics of the captured video data.

Optionally, the location request signal is generated and transmitted in an automated fashion. By way of a specific and non-limiting example, an office space with restricted access during non-business hours is provided with an entrance area within which the first user system (including video and/or audio sensors and optionally video and/or audio output devices such as a display screen and speakers, respectively) is located. When a visitor approaches the office space via the entrance area, an electronic sensor captures video and or audio data relating to the visitor. Optionally, a location request signal is transmitted to a predetermined subset of second systems within (or outside of) the office space, requesting a current location of the concierge or other designated individual. When the concierge or other designated individual is located within a sensing area of one of the subset of second systems, either a notification is sent to the concierge or other designated individual to inform him or her that a visitor has arrived, or a communication session is established between the concierge or other designated individual and the visitor. Further optionally, video and/or audio analytics processing is performed to identify the visitor. If the visitor is identified as being likely one of a known second user's contacts, then a location request signal is transmitted to a predetermined subset of second systems within (or outside of) the office space, requesting a current location of the known second user. For instance, if Mrs. X is working late and her husband, Mr. X, arrives to pick her up, then upon identifying Mr. X within the entrance area, a location request signal is generated and transmitted automatically for locating Mrs. X at one of a subset of second systems associated therewith. When Mrs. X is located within a sensing area of one of the subset of second systems, either a notification is sent to her to inform her that her husband has arrived, or a communication session is established between Mrs. X and Mr. X.

Figure 3:
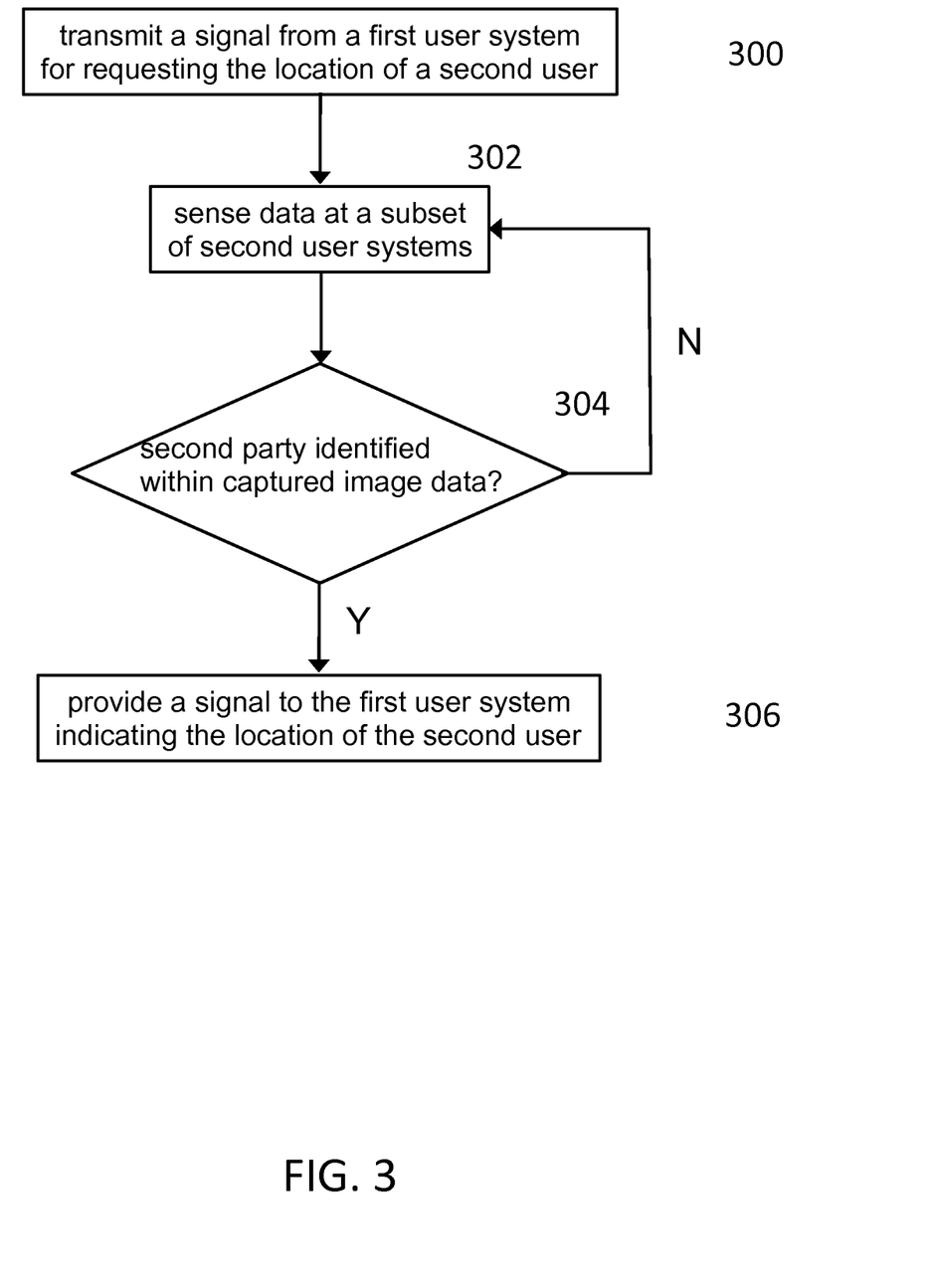
FIG. 3 is a simplified flow diagram of a method according to an embodiment of the instant invention.

Referring now to FIG. 3, shown is a simplified flow diagram of a method according to an embodiment of the instant invention. At 300 a signal is transmitted from a first user system for requesting a location of a second user. For instance, the signal is transmitted via a communication network to each second user system of a subset of a plurality of second user systems, with which subset the second user is associated. Alternatively, the signal is transmitted via a communication network to a third system, such as for instance a network server or a video/image/audio analytics server on the network. At 302, in response to the signal, data is sensed at each one of the subset of the plurality of second user systems. At 304, it is determined whether the second user is identified within the sensed data. For instance, at least a process in execution on a processor of each second user system of the subset of the plurality of second user systems is used to compare the sensed data with template data of the second user, or a process in execution on a processor of the third system is used to compare the sensed data with template data of the second user. If the second user is not identified, then the method loops to 302 and additional data is sensed. If the second user is identified, then a signal is transmitted to the first user system, indicating the current location of the second user. Alternatively, a signal is transmitted to the second user, telling the second user that the first user is looking for him or her.

Figure 4:
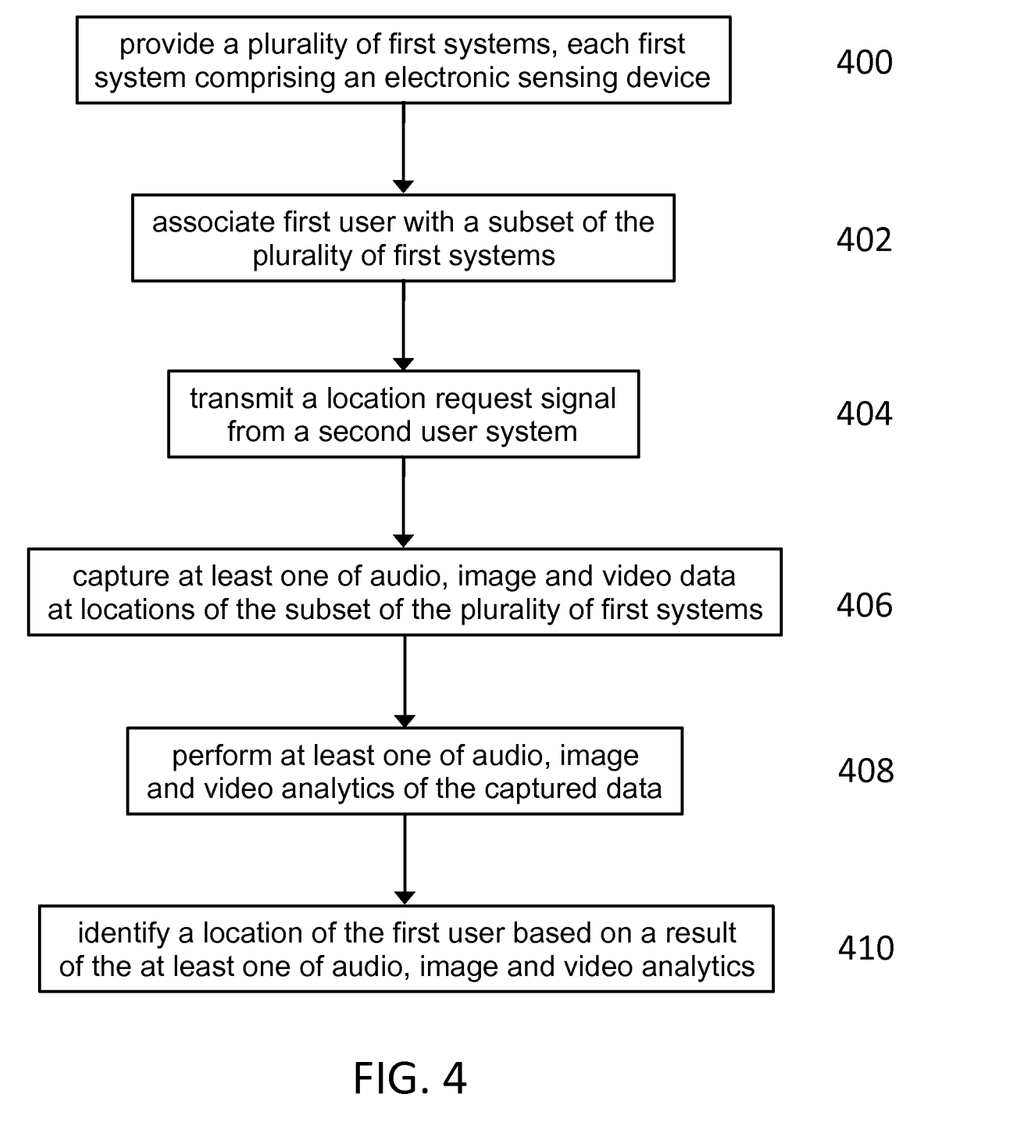
FIG. 4 is a simplified flow diagram of a method according to an embodiment of the instant invention.

Referring now to FIG. 4, shown is a simplified flow diagram of a method of locating a first user according to an embodiment of the instant invention. At 400 a plurality of first systems is provided, each first system of the plurality of first systems including at least an electronic sensing device for capturing at least one of audio, image and video data within a sensing area of said each first system. At 402 the first user is associated with a first subset of the plurality of first systems. At 404 a location request signal indicative of a request for locating the first user is transmitted from a second system. At 406, in response to the location request signal, at least one of audio, image and video data is captured within the sensing area of each first system of the first subset of the plurality of first systems. At 408 at least one of audio, image and video analytics of the at least one of audio, image and video data is performed. At 410, based on a result of the at least one of audio, image and video analytics, the first user is identified within the sensing area of one of the first systems of the first subset of the plurality of first systems.

Figure 5:
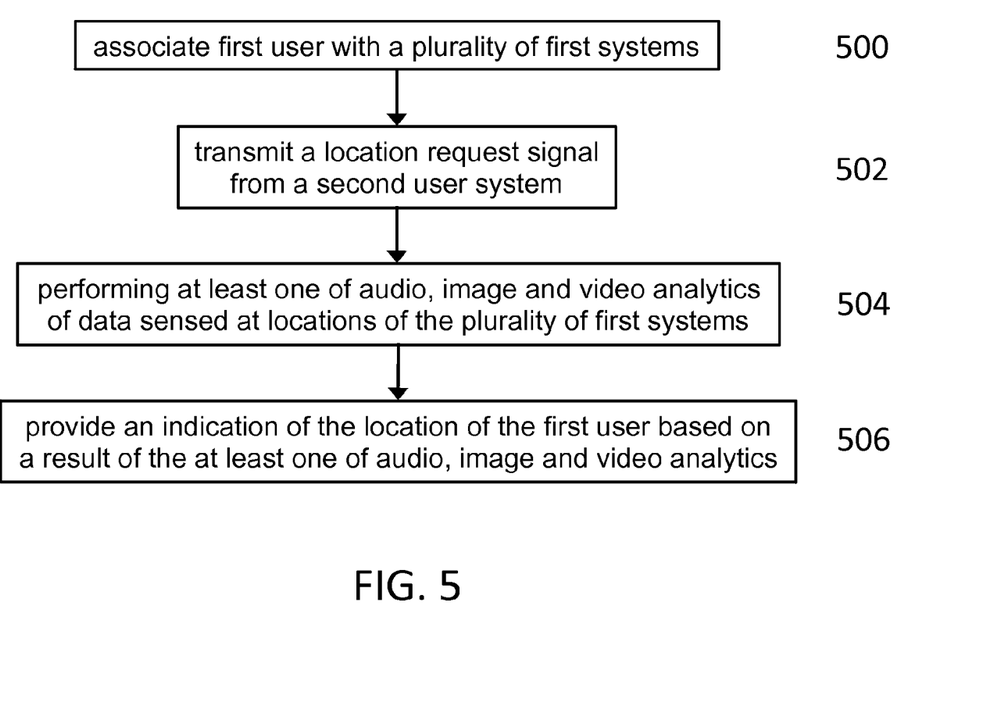
FIG. 5 is a simplified flow diagram of a method according to an embodiment of the instant invention.

Referring now to FIG. 5, shown is a simplified flow diagram of a method of locating a first user according to an embodiment of the instant invention. At 500 the first user is associated with a plurality of first systems, each first system of the plurality of first systems including at least an electronic sensing device for sensing data within a sensing area of said each first system. At 502, using a second system, a signal is transmitted that is indicative of a request for locating the first user within the sensing area of one of the plurality of first systems. At 504 at least one of audio, image and video analytics is performed of data that are sensed using the electronic sensing device of each first system of the plurality of first systems, to determine a presence of the first user within the sensing area of one of the plurality of first systems. At 506, when the first user is determined to be present within the sensing area of the one of the plurality of first systems, a first indication indicative of the location of the first user within the sensing area of the one of the plurality of first systems is provided.

Figure 6:
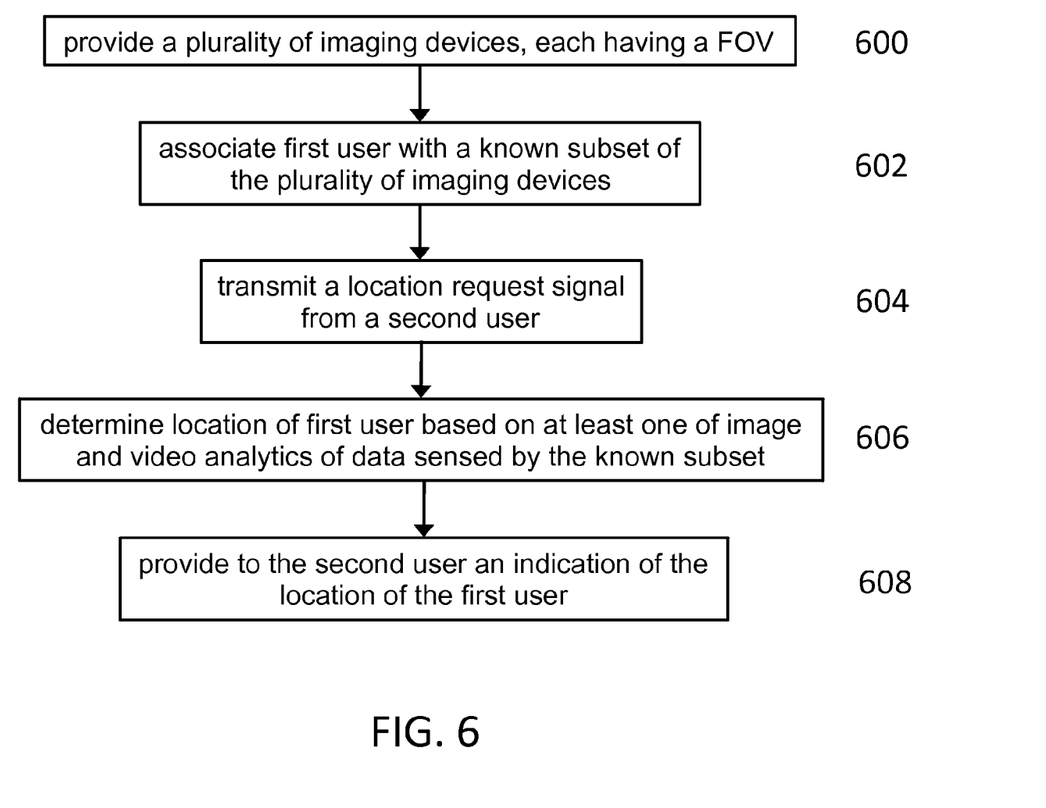
FIG. 6 is a simplified flow diagram of a method according to an embodiment of the instant invention; and, FIG. 7 is a simplified flow diagram of a method according to an embodiment of the instant invention.

Referring now to FIG. 6, shown is a simplified flow diagram of a method of locating a first user according to an embodiment of the instant invention. At 600 a plurality of imaging devices is provided, each imaging device of the plurality of imaging devices having associated therewith a known field of view (FOV). At 602 the first user is associated with a known first subset of the plurality of imaging devices, wherein the first subset of the plurality of imaging devices defines a first aggregated FOV. At 604, using a first system, a first signal is transmitted from a second user, the first signal indicative of a request by the second user for locating the first user within the first aggregated FOV. At 606 at least one of image analytics and video analytics of data that are captured using the imaging devices of the first subset of the plurality of imaging devices is performed, to determine a location of the first user within the first aggregated FOV. At 608, when the first user is located within the first aggregated FOV, a first indication indicative of the location of the first user within the first aggregated FOV is provided to the second user.

Figure 7:
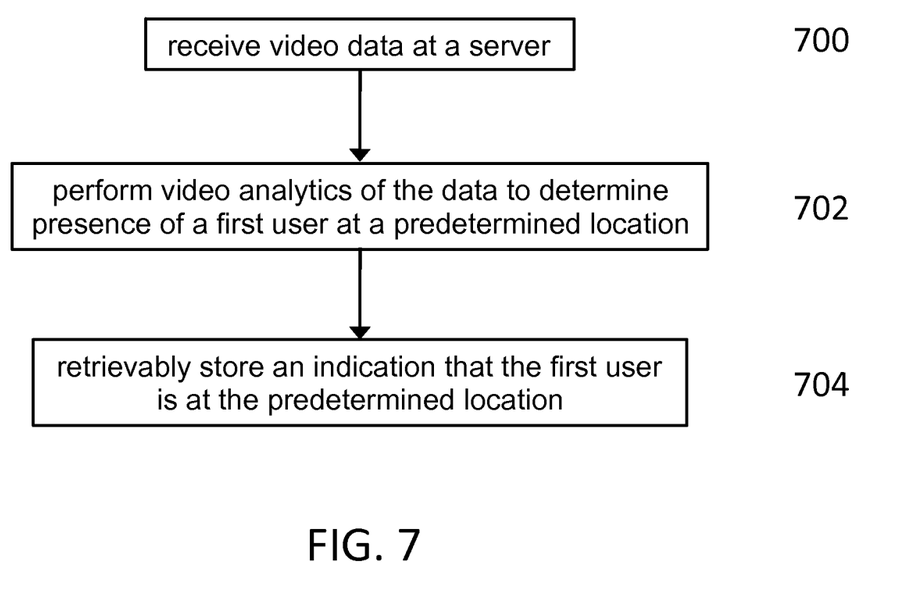

Referring now to FIG. 7, shown is a simplified flow diagram of a method of locating a first user according to an embodiment of the instant invention. At 700 video data is received at a server, via a communication network, from a sensor at a predetermined location that is remote from the server. At 702 a process in execution on a processor of the server is used for performing video analytics for determining a presence of the first user at the predetermined location. At 704, when a result of the video analytics is indicative of the first user being present at the predetermined location, an indication that the first user is at the predetermined location is retrievably stored within a memory element of the server.

Referring now to FIGS. 4-7, optionally the first individual is not identified uniquely, but rather a group consisting of a plurality of individuals is identified, wherein there is at least a predetermined probability that each individual of the group is actually the first individual. Optionally, image data for each of the different members of the group is presented to the party that requested the location of the first user. The requesting party may then select, from the different members of the group, the specific individual that he or she recognizes as being the first user.

Optionally, when the location of the first user is determined, a log entry is created. In this way, the system may learn over time the most likely locations for the first user. The subset of first systems or imaging devices may be modified, either to add new systems or imaging devices where the first user is most often located, or to remove first systems or imaging devices where the first user is not often located. Optionally, the log entries are used for security purposes, or to track productivity and/or task progress in the case of employees.

Numerous other embodiments may be envisaged without departing from the scope of the invention.

What is claimed is:

1. A method of locating a first user, comprising:
associating the first user with a plurality of first systems, each first system of the plurality of first systems including at least an electronic sensing device for sensing data within a sensing area of said each first system;
using a second system, transmitting a signal indicative of a request for locating the first user within the sensing area of one of the plurality of first systems;
performing at least one of audio, image and video analytics of data that are sensed using the electronic sensing device of each first system of the plurality of first systems, to determine a presence of the first user within the sensing area of one of the plurality of first systems; and,
when the first user is determined to be present within the sensing area of the one of the plurality of first systems, providing a first indication indicative of the location of the first user within the sensing area of the one of the plurality of first systems,
wherein the sensed data are transmitted from each first system of the plurality of first systems to a third system via a communication network, and the at least one of audio, image and video analytics is performed using a processor of the third system, and
wherein the third system comprises a plurality of user systems, and performing the at least one of audio, image and video analytics is accomplished according to a peer-to-peer protocol.

2. A method according to claim 1, wherein the first indication is provided to a second user via the second system.

3. A method according to claim 1, wherein the location request signal is transmitted, via the communication network, from the second system to each first system of the plurality of first systems.

4. A method according to claim 1, wherein the at least one of audio, image and video analytics comprises video analytics.

5. A method of locating a first user, comprising:
providing a plurality of imaging devices, each imaging device of the plurality of imaging devices having associated therewith a known field of view (FOV);
associating the first user with a known first subset of the plurality of imaging devices, wherein the first subset of the plurality of imaging devices defines a first aggregated FOV;

associating a third user with a known second subset of the plurality of imaging devices, wherein the second subset of the plurality of imaging devices defines a second aggregated FOV;

using a first system, transmitting a first signal from a second user indicative of a request by the second user for locating the first user within the first aggregated FOV;

performing at least one of image analytics and video analytics of data that are captured using the imaging devices of the first subset of the plurality of imaging devices, to determine a location o the first user within the first aggregated FOV; and, when the first user is located within the first aggregated FOV, providing to the second user a first indication indicative of the location of the first user within the first aggregated FOV.

6. A method according to claim 5, comprising, in response to the first signal, capturing data using each imaging device of the first subset of the plurality of imaging devices.

7. A method according to claim 5, wherein determining a location of the first user within the first aggregated FOV comprises determining a presence of the first user within data that are captured using a known imaging device of the first subset of the plurality of imaging devices.

8. A method according to claim 7, wherein the first indication includes an identifier of the known imaging device of the first subset of the plurality of imaging devices.

9. A method according to claim 5, wherein the first indication is provided to the second user via the first system.

10. A method according to claim 5, wherein the at least one of image analytics and video analytics is performed using a processor of the first system.

11. A method according to claim 5, wherein each imaging device of the first subset of the plurality of imaging devices comprises a processor for performing the at least one of image analytics and video analytics of data that are captured by said each imaging device.

12. A method according to claim 5, wherein the second aggregated FOV partially overlaps the first aggregated FOV.

* * * * *